(12) United States Patent
Dosdall (10) Patent No.: US 6,550,849 B1
(45) Date of Patent: Apr. 22, 2003

(54) AUTOMOTIVE VEHICLE WITH PASS THROUGH CARGO SPACE

(75) Inventor: James Michael Dosdall, Grosse Ile, MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 10/064,101

(22) Filed: Jun. 11, 2002

(51) Int. Cl.[7] .............................................. B62D 25/00
(52) U.S. Cl. ................. 296/183; 296/190.11; 296/37.6; 296/37.15; 296/146.12
(58) Field of Search ............................ 296/183, 190.11, 296/190.08, 37.6, 37.15, 26.11, 26.08, 146.12

(56) References Cited

U.S. PATENT DOCUMENTS

| | | |
|---|---|---|
| 3,567,274 A | 3/1971 | Kaptur, Jr. et al. |
| 3,592,504 A | 7/1971 | Sandor |
| 3,889,419 A | 6/1975 | Maleck |
| 4,076,301 A | 2/1978 | Gergoe |
| 4,132,034 A | 1/1979 | Van Siclen |
| 4,480,868 A | 11/1984 | Koto |
| 4,495,673 A | 1/1985 | Khan |
| 4,503,584 A | 3/1985 | Malchow |
| 4,694,609 A | 9/1987 | Torabi |
| 4,738,480 A * | 4/1988 | Ward ..................... 296/37.6 X |
| 4,848,832 A | 7/1989 | Starnes |
| 4,941,702 A * | 7/1990 | Southward ................. 296/37.6 |
| 4,955,973 A | 9/1990 | Provencher |
| 4,971,380 A | 11/1990 | Cote et al. |
| 5,244,335 A | 9/1993 | Johns |
| 5,454,684 A | 10/1995 | Berens |
| 5,772,271 A | 6/1998 | Sanders |
| 5,934,727 A | 8/1999 | Storc et al. |
| 5,988,725 A | 11/1999 | Cole |
| 6,065,798 A | 5/2000 | Sankrithi |
| 6,260,916 B1 * | 7/2001 | Hunt ..................... 296/190.11 |
| 6,276,751 B1 * | 8/2001 | Ikarashi et al. ........ 296/190.11 |
| 6,398,291 B1 * | 6/2002 | Reusswig et al. ........... 296/183 |
| 6,416,104 B1 * | 7/2002 | Fisher et al. ............. 296/37.16 |
| 6,447,039 B1 * | 9/2002 | Song ......................... 296/37.6 |
| 6,447,051 B1 * | 9/2002 | Lukomskiy ................. 296/183 |
| 6,478,355 B1 * | 11/2002 | Van Eden et al. ......... 296/37.6 |

OTHER PUBLICATIONS

GM Corporation 2001, Avalanche Like A Rock—Promotional brochure featuring information on the Chevy Avalanche.

* cited by examiner

Primary Examiner—Joseph D. Pape
(74) Attorney, Agent, or Firm—Gigette M. Bejin (57) ABSTRACT

A vehicle arrangement (7) is provided having a front mounted engine (20) enclosed by an engine compartment (18). A passenger compartment (26) is provided which is separated from a cargo bed (44) by a door (54). The door (54) has a lower horizontally hinged panel (108). The panel (108) allows for access of a forward cargo space (114) that is positioned underneath a rear row (42) of passenger seating. The forward cargo space (114) in conjunction with the cargo bed (44) allows transport and storage of large construction materials without an overall lengthening of the vehicle body (16).

21 Claims, 7 Drawing Sheets

AUTOMOTIVE VEHICLE WITH PASS THROUGH CARGO SPACE

BACKGROUND OF INVENTION

The present invention relates to automotive vehicles and more particularly, automotive vehicles such as vans or light trucks, which provide a cargo bed in addition to a passenger compartment.

In the most recent two decades, popularity for vans and light trucks has increased among the motoring public. Many vans (including minivans) and light trucks typically have an elevated seating position for a vehicle operator. Many vehicle operators have found this elevated position to be preferable.

Most vans provide an advantage of a more spacious passenger compartment than that of conventional cars. Pickup trucks provide an advantage over most cars since they have a cargo bed that can be used to move bulky loads such as home furnishings, home appliances and construction materials.

To provide the advantages of a van and that of a truck into a single vehicle, several automotive vehicles have been brought forth. An example is the 2001 Ford Explorer Sport Trac®, which is equipped with two rows of passenger seating and a pickup bed. However the bed is somewhat smaller than a normal pickup truck bed. Even the larger two row passenger seating compartment 2002 Lincoln Blackwood™ has a smaller bed than a conventional full size standard cab pickup truck.

It is desirable to provide a vehicle with two rows of passenger seating in the passenger compartment which additionally has a cargo bed able to accommodate extension ladders or other long building materials such as plywood, particle board, or plaster board which typically come in four by eight foot sheets.

It is desirable to provide the same cargo carrying capacity without extending the overall length of the vehicle beyond that normally provided in most sport-utility vehicles or pickup truck type vehicles.

SUMMARY OF INVENTION

A practitioner of the art enlightened by the present invention is set free to provide an automotive vehicle arrangement having an advantage of a van, including a passenger compartment with two rows of seating. The inventive vehicle arrangement also has the advantage of a pickup truck having a capacity for carrying elongated articles such as ladders and/or building materials.

In a preferred embodiment the vehicle arrangement of the present invention has a front engine enclosed by an engine compartment. A passenger compartment is provided rearward of the engine compartment. The passenger compartment has front and rear passenger seating typically provided along a common floor platform. A cargo bed is additionally provided, generally continuous with the common floor platform. A door separates the passenger compartment from the remainder of the cargo bed.

The door has a vertical axis hinge arrangement allowing the door to be latched or pivoted about points adjacent its two lateral extreme ends. Accordingly, the door can be opened from either side. Along the lower end of the door is a panel with a horizontal hinge axis. Opening the panel allows a portion of the passenger compartment in collaboration with the cargo bed to accommodate elongated articles which previously could not be accommodated in prior van or van-type vehicles having a full length two row passenger seating compartment with a regular non-extended cargo bed. The overall length of the vehicle arrangement can be held to a length typically associated with a minivan.

It is an advantage of the vehicle arrangement of the present invention to provide a vehicle having front and rear row passenger seating and an enclosed cab which can additionally provide a cargo bed to accommodate elongated materials without overly extending an overall length of the vehicle.

Other features and advantages of the present invention will become more apparent to those skilled in the art from the following description of preferred embodiments which refer to the accompanying drawings and detailed description.

DETAILED DESCRIPTION

Figure 1:
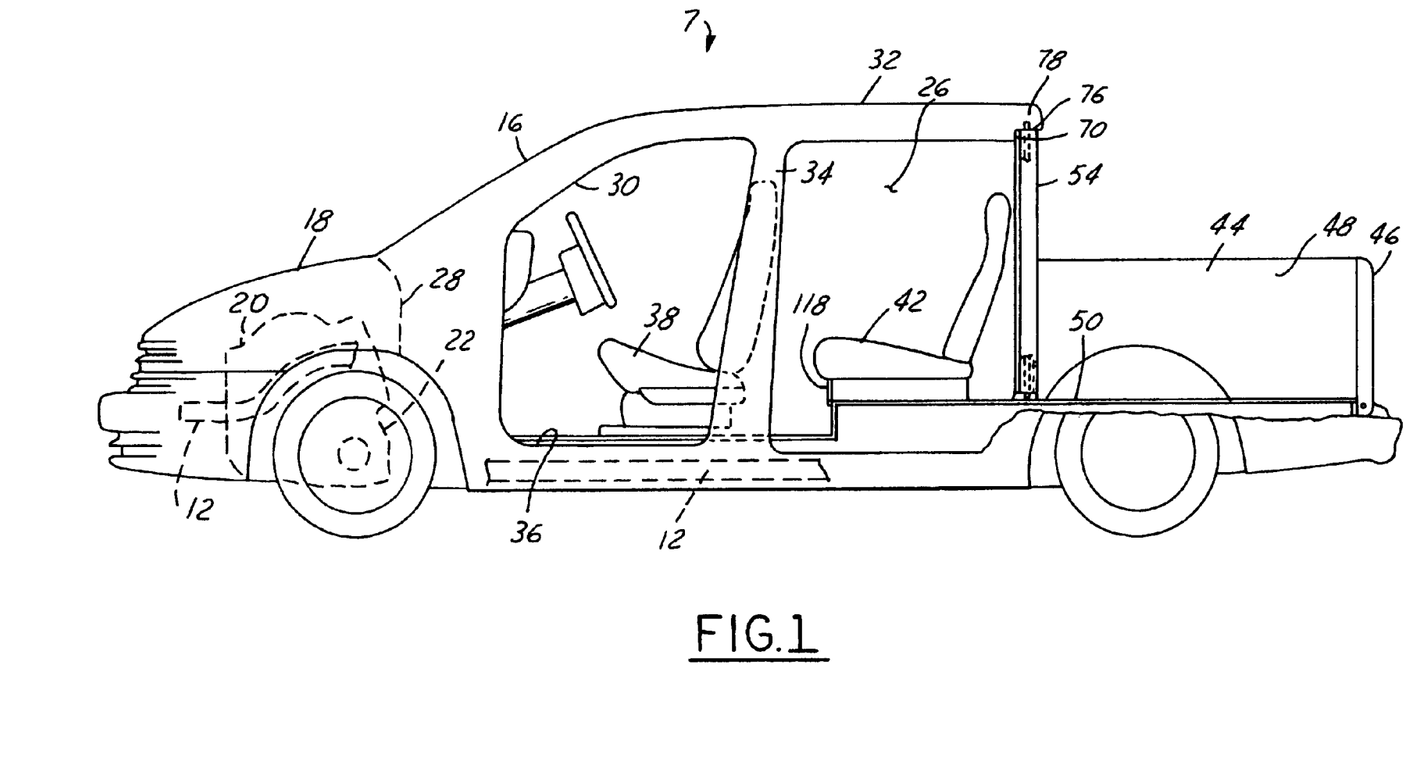
FIG. 1 is a side elevational view of a vehicle arrangement according to the present invention.
Figure 2:
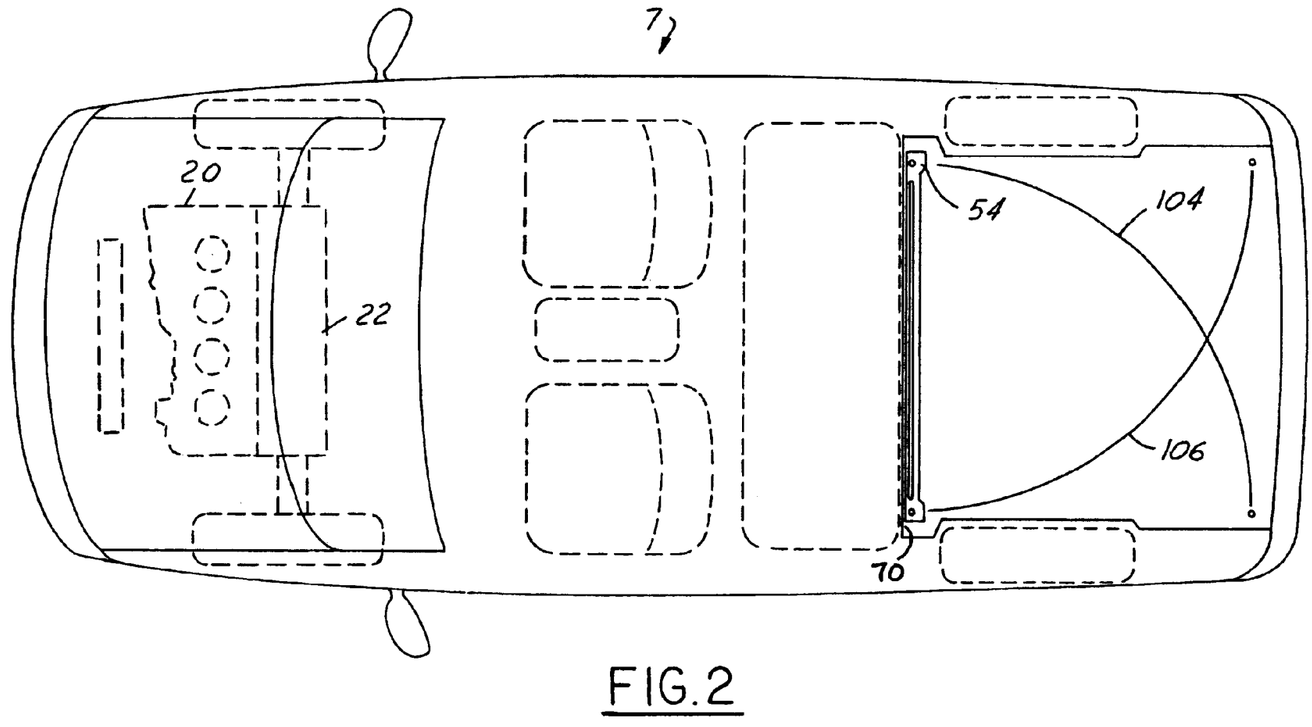
FIG. 2 is a top plan view of the vehicle shown in FIG. 1.

Referring to FIGS. 1–2, a vehicle arrangement 7 is provided. The vehicle arrangement 7 has a chassis 12 which is only partially shown. Connected on the chassis 12 is a vehicle body 16. The vehicle body has a front engine compartment 18. Mounted within the engine compartment 18 is a transverse mounted engine shown schematically as item 20. The engine 20 is mounted on the chassis 12. The engine 20 via a transmission and transaxle 22 provides the vehicle 7 with a front wheel drive arrangement. In other embodiments of the present invention, an inline-mounted engine with a rear powered axle design may be utilized.

Rearward of the engine compartment 18 is a passenger compartment 26. The passenger compartment 26 is separated from the engine compartment 18 by a fire wall 28. The passenger compartment 26 is encircled by an A-pillar 30 and a roof 32. Supporting the roof 32 is a B-pillar 34. The passenger compartment 26 has a floor 36. The floor 36 provides a supporting platform for the front passenger seating row 38. The passenger compartment 26 also has a rear row of passenger seating 42. The front and rear rows of passenger seating 38, 42 share the common floor 36.

The vehicle 7 has a cargo bed 44. The cargo bed 44 is bordered by a tailgate 46. Laterally, the cargo bed 44 is bordered by side portions 48. The cargo bed 44 has a floor 50, continuous with the floor 36 that extends underneath the rear seating row 42.

The vehicle 7 has a transverse door 54. The door separates the passenger compartment 26 from the rearward cargo bed 44. For clarity of illustration, door 54, including appropriate weather stripping is not shown.

Referring additionally to FIGS. 3–6, the door 54 has an upper window 58. The window 58 has lateral ends 60. The lateral ends 60 are guided within door interior mounted channels 62. The window 58 is retractable by a cross arm window regulator 63 that is conventional in the art. The regulator 63 has a motor 64 which is powered via a circuit having a terminal 66 which mates with a mating end terminal (not shown) provided within the passenger compartment along a lower end of a face flange 70 that the door 54 fits up adjacent to.

Adjacent to extreme lateral ends 60 are two upper apertures 72 and two lower apertures 74. The upper apertures 72 are mated with apertures 76 provided in a reinforced inner rim portion 78 of the roof 32. In a similar manner, the lower apertures 74 are aligned with apertures 80 provided in a reinforced portion of the floor.

Also adjacent to extreme lateral ends 60 of the door 54 are hinge assemblies 82. Each hinge assembly has an extendable cylinder 84 which will be typically electrically powered by a worm gear arrangement (not shown). Cylinder 84 is connected with a bracket 86. The bracket 86 is in turn connected with inner links 88. The inner links 88 are pivotally connected with outer links 90. The upper outer link 90 is pivotally connected with an upper turn bar 92. The lower outer link 90 is pivotally connected with lower turn bar 94. The upper and lower turn bars 92,94 are laterally stabilized by sleeves 96. Sleeves 96 are fixably connected to a lateral edge 98 of the door 54. The outer links 90 generally adjacent their midsections 102, are pivotally connected with the door 54.

Extension of the cylinder 84 (shown on the left side in FIG. 4), will cause the upper turn bar 92 to extend through apertures 72, 74. Simultaneously, lower turn bar 94 will extend through apertures 74, 80. The door 54 can then be swung open along line 104 as shown in FIG. 2. If the hinge assembly 82 on the opposite side is extended and on the right side is retracted, the door 54 can b open along line 106. If both hinge assemblies 82 have their cylinders 84 extended, the door 54 will be locked in position. If both hinge assemblies 82 have their cylinders 84 retracted simultaneously, the door 54 can be removed from the vehicle.

Figure 5:
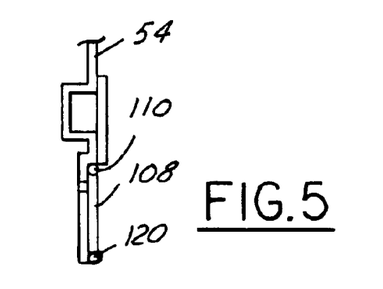
FIG. 5 is a partial sectional view of a portion of the door shown in FIG. 4.
Figure 6:
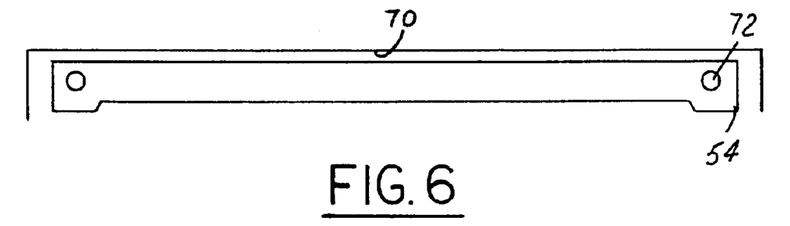
FIG. 6 is a top elevational view of the door shown in FIG. 4.
Figure 7:
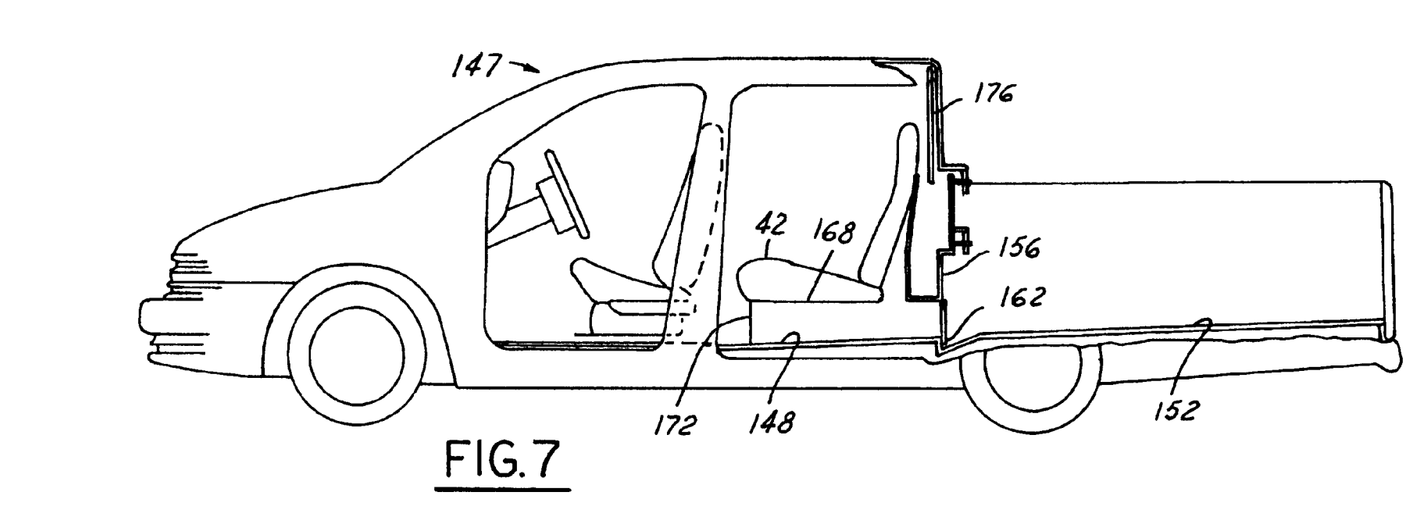
FIG. 7 is a side elevational view similar to that of FIG. 1 of an alternate preferred embodiment vehicle according to the present invention.
Figure 8:
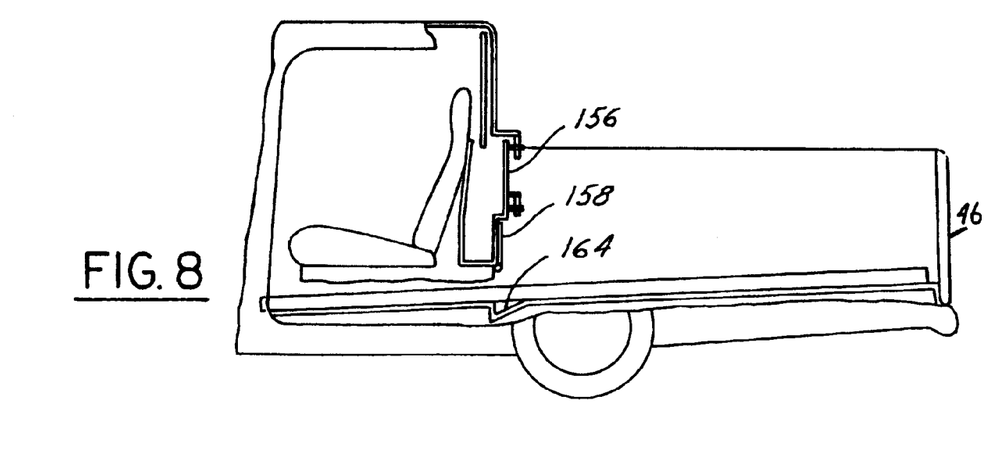
FIG. 8 is a view similar to that of FIG. 7 with the panel on the door being pivoted to its upright position and the cargo bed of the vehicle being loaded with a sheet of construction material.
Figure 9:
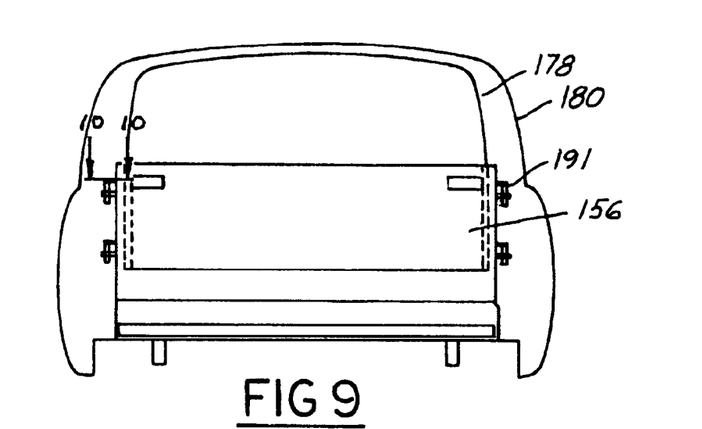
FIG. 9 is a rear view of the vehicle shown in FIG. 8 with the tires and suspension removed for clarity of illustration.

Turning to FIG. 5, adjacent a lower end of the door 54 is a panel 108. The panel 108 has a width approximately equal to the width of the cargo bed 44 and a height comparable to the space available under the rear passenger seating row 42. The panel 108 has an upper end 110 with a horizontal hinge axis.

Figure 3:
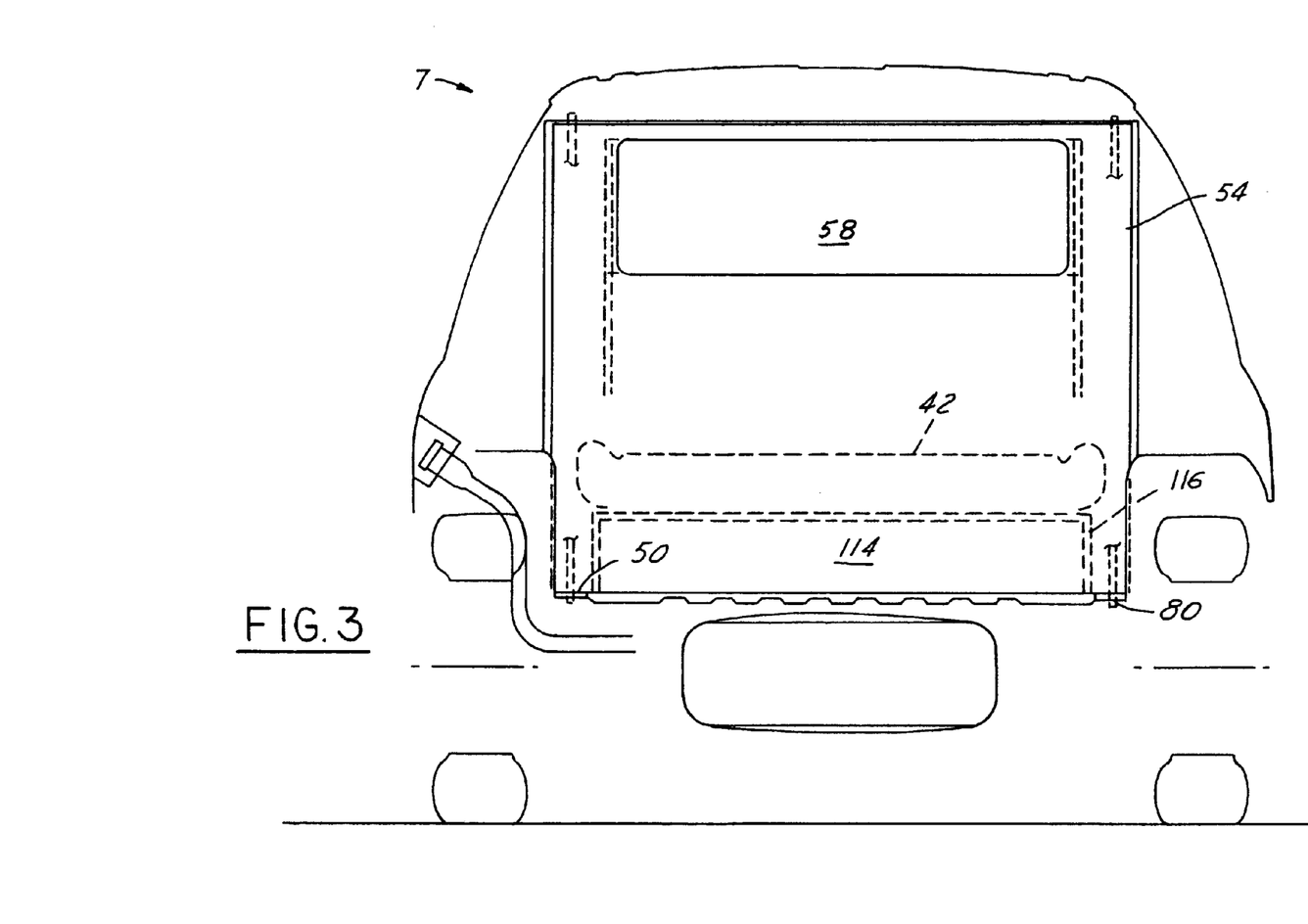
FIG. 3 is a rear elevational view of the vehicle shown in FIG. 1.
Figure 4:
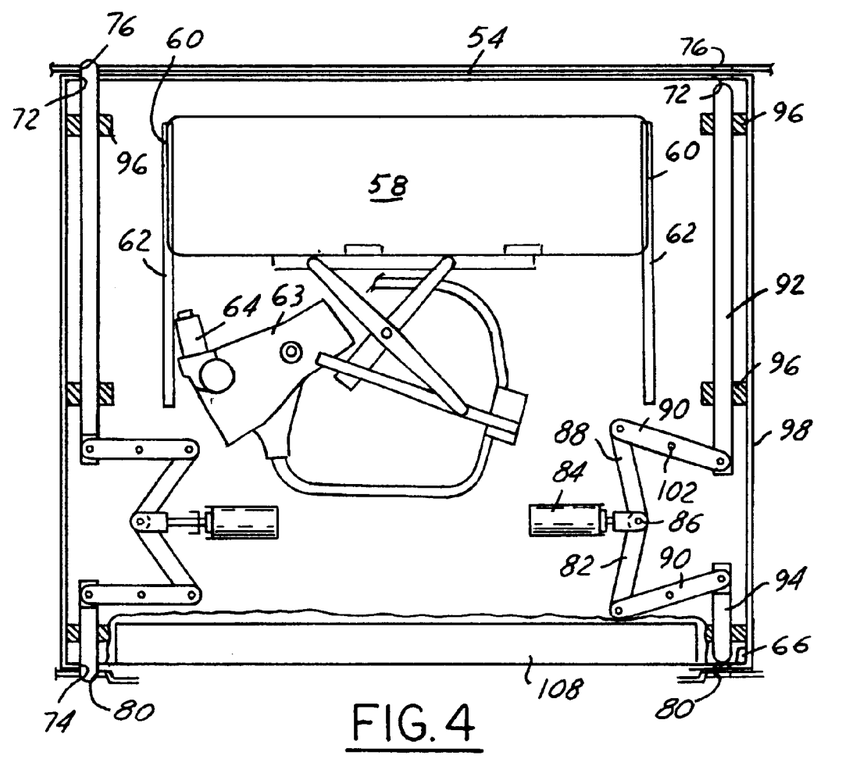
FIG. 4 is a sectional view of a door which separates a passenger compartment and cargo space of the vehicle shown in FIG. 1.

Turning to FIG. 3, when the panel 108 is at its raised position, there is access to a forward cargo space 114. The forward cargo space 114 extends generally underneath the rear seating row 42 and is laterally bounded by side edges 116.

In combination with the cargo bed 44, the forward cargo space 114 can accommodate four foot by eight foot sheets of construction material such as plywood and plaster board or other long and shallow articles without disturbing the passenger compartment seating or exposing the passenger compartment to the outside environment.

The floor 36 of the forward cargo space 114 is generally continuous with the floor 50 of the cargo bed 44 (FIG. 1). A forward end of the cargo area 44 has a drawer 118 to allow access to the forward cargo space for the storage of tools or other items. The storage of the forward cargo space 114 will be secure when the door 54 is in place and the panel 108 is closed. At its bottom end, the panel 108 can have a latch or lock 120 (FIG. 5) to prevent access to the forward cargo space 114 when the vehicle 7 is parked and unattended.

Vehicle 7 can accommodate four by eight ft. sheets of plywood with the tailgate 46 in the closed position and with the door 54 in position. This is an extreme advantage since the door 54 does not have to be removed or opened when moving sheets of plywood or other construction materials during cooler weather. As obvious to those skilled in the art, the door 54 can be removed during pleasant weather to add to vehicle occupant comfort.

Like the two-way tailgates popular on station wagons in the 1980s, the hinge assemblies 82 turn bars 92, 94 act as hinges, permitting rotation around their axis. Other combination hinge/latch configurations, for example, extendable pins or ganged sliding pins as found in a common architectural deadbolt lock, will be apparent to one skilled in the art.

A lockout linkage can be added to prevent release of any hinge assemblies 82 unless the window 58 is fully retracted. Releasing both hinge assemblies 82 allows the door 54 to be removed from the vehicle.

Removing the door 54 permits unobstructed access to the rear of the passenger compartment 26 for its optional use as cargo area. Cargo space may be further enhanced by removing any or all passenger seats 38, 42 by methods conventional to the art. Wheelchair access may be similarly accommodated.

As mentioned previously, an advantage of the present invention is that the cargo bed floor 50 is continuous with the floor 36 of the forward cargo space 114. In the example of vehicle arrangement 7 shown, utilization of front wheel drive removes the requirement for a rear axle differential, resulting in a lower floor than that normally provided in most pickup trucks which are rear wheel drive vehicles.

The present vehicle also provides a more optimum weight distribution when carrying heavy articles since the rear axle will not have to support the weight of a differential. Accordingly, variances in the load upon the front and rear axle can be minimized.

Referring to. FIGS. 7–9 and 11, an alternate preferred embodiment vehicle arrangement 147 is provided. Vehicle 147 has an engine (not shown) generally similar to that previously described which is transverse or fore and aft mounted. The vehicle 147 has a unibody construction rather than a chassis construction. The vehicle 147 has a generally inclined floor 148. The incline floor is generally continuous with a cargo bed floor 152.

The vehicle 147 has a door 156. The door 156 has a panel 158 which is hinged along a horizontal axis as previously described. The lower end 162 of the panel 158 is fitted within a depression 164 of the cargo bed floor 152. The passenger seating rear row 42 is positioned on top of a platform 168 that is open at its forward end 172 to allow for passage of stored items. The vehicle 147 has an extendable window 176. Window 176 extends into a channel 178 within the C-pillar 180. Accordingly, the door 156 cannot be swung open unless the window 176 is in its retracted position.

Figure 10A:
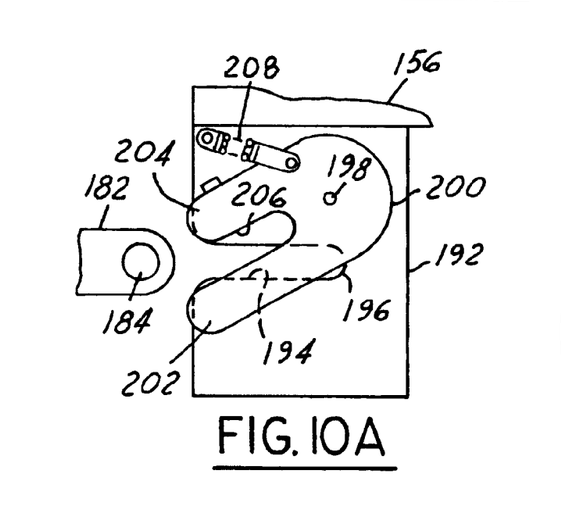
FIGS. 10A and 10B are operational views taken along lines 10—10 of FIG. 9 showing the latch mechanism for the vehicle door in FIGS. 7–8.
Figure 10B:
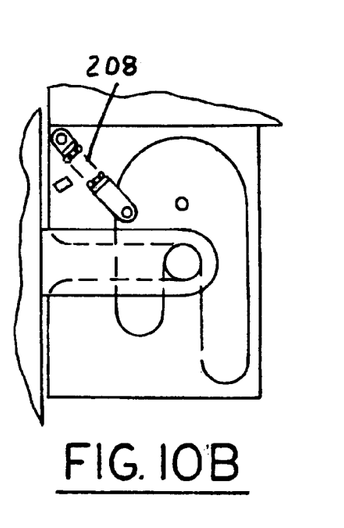

Referring additionally to FIGS. 10A and 10B, a post and claw door latch arrangement 191 is provided. The door latch arrangement allows the door 156 to be latched or to pivot about a common axis. A door jam or opening of the vehicle door 156 has upper and lower side extensions 182 as best shown in FIGS. 10A and 10B. Each side extension 182 supports a generally vertically extending post 184.

Along its lateral sides, door 156 has upper and lower side brackets 192. The side brackets 192 have a transverse slot 194 having a blind end 196. Pivotally mounted to the side brackets 192 along pivot pin 198 is a claw bracket 200. The claw bracket 200 has a long finger 202 and a short finger 204. A spacing 206 is provided between the long finger 202 and the short finger 204.

When it is desired that the door 156 pivot about its extreme end, the post 184 is positioned within the transverse slot 194 adjacent the blind end 196. The placement of the post 184 causes the claw bracket 200 to pivot against the force provided by biasing spring 208. Subsequent release of the door 156 on its left end (not shown) will allow the claw bracket 200 to pull away from the post 184. Upon door release the post will be positioned within the spacing 206 and blind end 196 to allow for the door pivotal movement.

The door 156 has a similar arrangement on the opposite end with the side extension claw bracket being geometrically reversed or mirrored to allow it to pivot about the door's left end. The claw bracket 200 is biased in its normal position by biasing spring 208. When the door 156 is being opened with its left end (U.S. passenger side) pivotally connected, the claw bracket 200 will pivot in a clockwise direction away from post 184 to allow for the door's pivotal movement.

Figure 11:
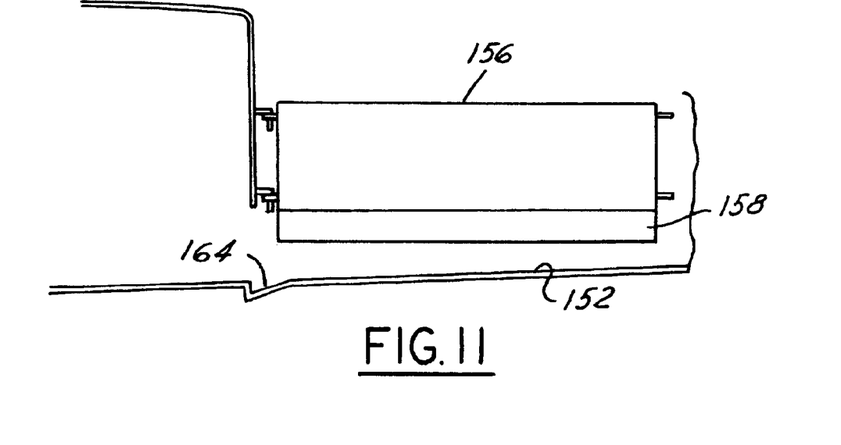
FIG. 11 is a side elevational view of the door shown in FIGS. 7, 8 and 9 being open to allow access to the passenger compartment of the vehicle.

Panel 158 must pivot upward to allow the door 156 to provide clearance from the cargo inclined floor 152. Simultaneous release of the door latch arrangement 191 will allow the door 156 to be lifted up and removed from the vehicle.

Figure 12:
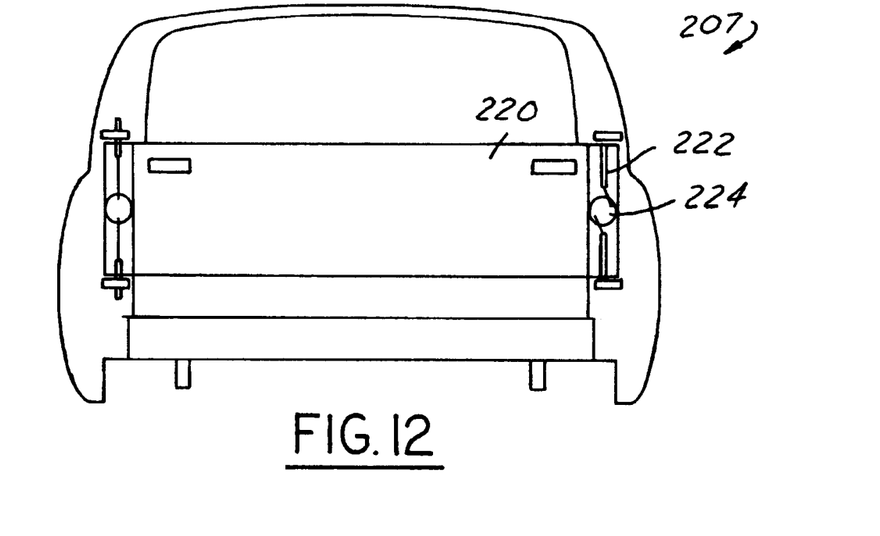
FIG. 12 is a view similar to that of FIG. 9 illustrating an alternate preferred embodiment door hinge mechanism according to the present invention.
Figure 13:
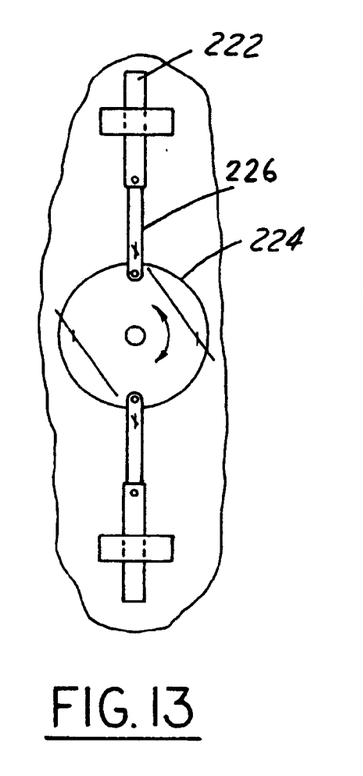
FIG. 13 is an enlargement of the door hinge mechanism shown in FIG. 12.
Figure 14:
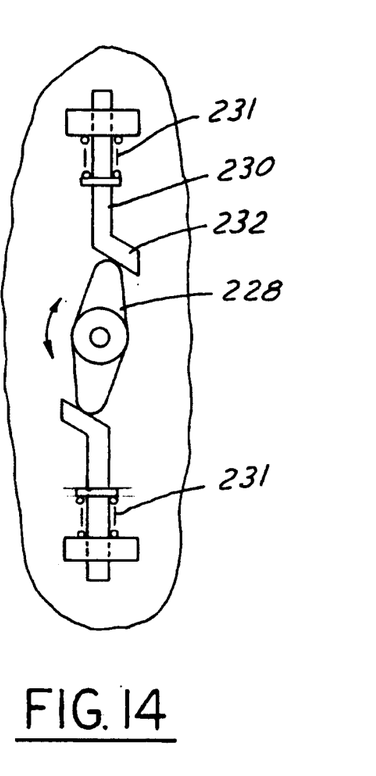
FIG. 14 is an enlargement of an alternative preferred embodiment door hinge to that shown in FIG. 13.

Referring additionally to FIGS. 12–14, a vehicle arrangement 207 with a door 220 is provided. Door 220 has on its opposite extreme ends latch pins 222. Latch pins 222 are mechanically extended by a circle member 224. Circle member 224 is attached to the latch pins 222 via intermediate links 226. A motor (not shown) is provided to extend and retract the circle member 224.

In an alternative embodiment (FIG. 14), the door at its opposite ends has a motorized cam member 228. Cam member 228 engages two pins 230 having cam engagement portions 232. The pins 230 are biased to their retracted position by springs 231.

Although the invention has been described in relation to particular embodiments thereof, many other variations and modifications and other uses' will become apparent to those skilled in the art without departing from the spirit and scope of this invention as defined by the following claims.

What is claimed is:

1. An arrangement of an automotive vehicle, comprising:
   a front mounted engine, said engine being enclosed by an engine compartment;
   a passenger compartment rearward of said engine compartment, said passenger compartment having a front row and a rear row of passenger seating;
   a cargo bed rearward of said passenger compartment; and
   a door separating said passenger compartment from said cargo bed, said door having a lower horizontal axis hinge panel.

2. An arrangement of an automotive vehicle as described in claim 1, having a forward cargo space generally continuous with said cargo bed, said forward cargo space being positioned underneath said rear row of passenger seating and accessible via said door panel.

3. An arrangement of an automotive vehicle as described in claim 1, wherein said vehicle has a transverse mounted front wheel drive engine arrangement.

4. An arrangement of an automotive vehicle as described in claim 2, wherein said forward cargo space can be accessed by a drawer positioned generally underneath said rear row of seating.

5. An arrangement of an automotive vehicle as described in claim 1, wherein said door has an upper window.

6. An arrangement of an automotive vehicle as described in claim 5, wherein said upper window is retractable.

7. An arrangement of an automotive vehicle as described in claim 1, wherein said door has a vertical hinge axis.

8. An arrangement of an automotive vehicle as described in claim 7, wherein said door has a hinge axis adjacent extreme lateral ends of said door.

9. An arrangement of an automotive vehicle as described in claim 2, wherein said cargo bed in combination with said forward cargo space can accommodate four foot by eight foot sheets of building materials.

10. An arrangement of an automotive vehicle as described in claim 1, wherein said door is removable.

11. An arrangement of an automotive vehicle, comprising:
    a front mounted engine, said engine being enclosed by an engine compartment;
    a passenger compartment rearward of said engine compartment, said passenger compartment having at least a front row of passenger seating;
    a cargo bed rearward of said passenger compartment; and
    a transverse door separating said passenger compartment from said cargo bed, said door having a vertical axis hinge arrangement allowing said door to be latched or pivoted about points adjacent lateral extreme ends of said door.

12. An arrangement of an automotive vehicle, comprising:
    a front mounted engine;
    an engine compartment enclosing said engine;
    a passenger compartment rearward of said engine compartment, said passenger compartment having a front row and a rear row of passenger seating;
    a cargo bed rearward of said passenger compartment, said cargo bed having a floor;
    a vertically hinged door separating said passenger compartment from said cargo bed, said door having a lower horizontal axis hinged panel; and
    a forward cargo space generally continuous with said floor of said cargo bed, said forward cargo space being positioned underneath said rear row of passenger seating and said forward cargo space being accessed through said panel.

13. An arrangement of an automotive vehicle as described in claim 12, wherein said forward cargo space and said cargo bed are inclined upward towards a rear end of said cargo bed.

14. An arrangement of an automotive vehicle as described in claim 12, wherein said door cannot be opened unless said panel is pivoted upwards.

15. An arrangement of an automotive vehicle as described in claim 12, wherein said door has hinge pins which are joined to a circular member by links and wherein rotation with said circular member extends or retracts said hinge pins.

16. An arrangement of an automotive vehicle as described in claim 12, wherein said door has a cam member engaged with cam engagement portions of spring biased hinge pins and wherein rotation of said cam member causes said hinge pins to retract or to extend.

17. An arrangement of an automotive vehicle as described in claim 12, wherein said door has a post and claw door latch arrangement with the remainder of said vehicle to allow said door to be latched or pivoted about points adjacent to lateral extreme ends of said door.

18. An arrangement of an automotive vehicle, comprising:
   a front transverse mounted engine for front wheel drive powering of said vehicle;
   an engine compartment enclosing said engine;
   a passenger compartment rearward of said engine compartment, said passenger compartment having a front row and a rear row of passenger seating along a common floor for said front and rear rows of passenger seating;
   a cargo bed rearward of said passenger compartment, said cargo bed having a floor;
   a door with a vertical hinge axis separating said passenger compartment from said cargo bed, said door having a lower panel having a horizontal hinge axis; and
   a forward cargo space generally continuous with said floor of said cargo bed, said forward cargo space being positioned underneath said rear row of passenger seating of said vehicle and being accessible through said door panel and said cargo bed and said forward cargo space accommodating building materials of a four by eight foot dimension.

19. An arrangement of an automotive vehicle as described in claim 18, wherein said forward cargo space can be accessed by a drawer positioned generally underneath said rear row of seating.

20. An arrangement of an automotive vehicle as described in claim 18, wherein said door is vertically hinged adjacent to extreme lateral ends of said door.

21. An arrangement of an automotive vehicle as described in claim 11, wherein said door may be removed by releasing said hinge arrangement on both sides said door.

* * * * *